United States Patent
Chiu

(10) Patent No.: US 9,389,662 B2
(45) Date of Patent: Jul. 12, 2016

(54) RECTIFIER CIRCUIT AND POWERED DEVICE

(71) Applicant: HON HAI PRECISION INDUSTRY CO., LTD., New Taipei (TW)

(72) Inventor: Yi-Guo Chiu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 303 days.

(21) Appl. No.: 14/200,030

(22) Filed: Mar. 7, 2014

(65) Prior Publication Data

US 2014/0331066 A1  Nov. 6, 2014

(51) Int. Cl.
G06F 1/26 (2006.01)
H02H 11/00 (2006.01)
H04L 12/10 (2006.01)

(52) U.S. Cl.
CPC ............. G06F 1/266 (2013.01); H02H 11/002 (2013.01); H04L 12/10 (2013.01)

(58) Field of Classification Search
CPC ........... G06F 1/26; G06F 1/266; H04L 12/10; H02H 11/002
See application file for complete search history.

(56) References Cited

U.S. PATENT DOCUMENTS

2006/0217847 A1   9/2006   Anderson
2007/0171690 A1*  7/2007   Apfel .............. H02M 7/23 363/127
2014/0085948 A1*  3/2014   Huynh ............ H02M 7/219 363/80
2014/0129850 A1*  5/2014   Paul ............... H04L 12/10 713/300

FOREIGN PATENT DOCUMENTS

| EP | 2073436 | 6/2009 |
| TW | 200816704 | 12/2009 |
| TW | 201119282 | 6/2011 |
| TW | 200814607 | 12/2011 |
| TW | 201240386 | 10/2012 |

* cited by examiner

*Primary Examiner* — Dennis M Butler
(74) *Attorney, Agent, or Firm* — ScienBiziP, P.C.

(57) ABSTRACT

A powered device is electronically connected to a power sourcing equipment, and includes a powered circuit, a receiving unit and at least one rectifier circuit. Each rectifier circuit includes a rectifier unit, an auxiliary power unit, a polarity determining unit, a control unit and a selecting unit. The rectifier unit provides a current flow between the receiving unit and the powered circuit. The auxiliary power unit provides an auxiliary power signal. The polarity determining unit detects the polarity of voltage signal, to generate a determining signal. The control unit outputs a control signal according to the auxiliary power signal and the determining signal. The selecting unit connects the positive input of the powered circuit to a receiving end whose output voltage is positive according to the control signal, to lower power of rectification. A rectifier circuit is also provided.

20 Claims, 3 Drawing Sheets

RECTIFIER CIRCUIT AND POWERED DEVICE

BACKGROUND

1. Technical Field

The disclosure relates to providing power over Ethernet, and particularly to a rectifier circuit and a powered device applied in power over Ethernet.

2. Description of Related Art

A power over Ethernet (POE) describes any of several standardized or ad-hoc systems which pass electrical power along with data through Ethernet cabling. This allows a single cable to provide both data connection and electrical power to devices. Unlike standards such as an universal serial bus (USB) which also power devices over the data cables, the POE allows long cable lengths.

In addition to standardizing existing practice for spare-pair and common-mode data pair power transmission, the POE standards provide for signaling between a power source equipment (PSE) and a powered device (PD). The signaling allows the presence of a conformant device to be detected by the PSE, and allows the device and source to negotiate the amount of power required or available. The PSE provides power through the Ethernet cable. The maximum allowed continuous output power per cable for the institute of electrical and electronic engineers (IEEE) 802.3af is 15.40 W, and the later specification, IEEE 802.3at, offers 25.50 W. The PD is powered by the PSE and consumes energy. Examples of the PD include wireless access points, internet protocol (IP) phones, and IP cameras. Therefore, it is necessary to provide a rectifier circuit with low power consumption for the POE.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

Figure 1:
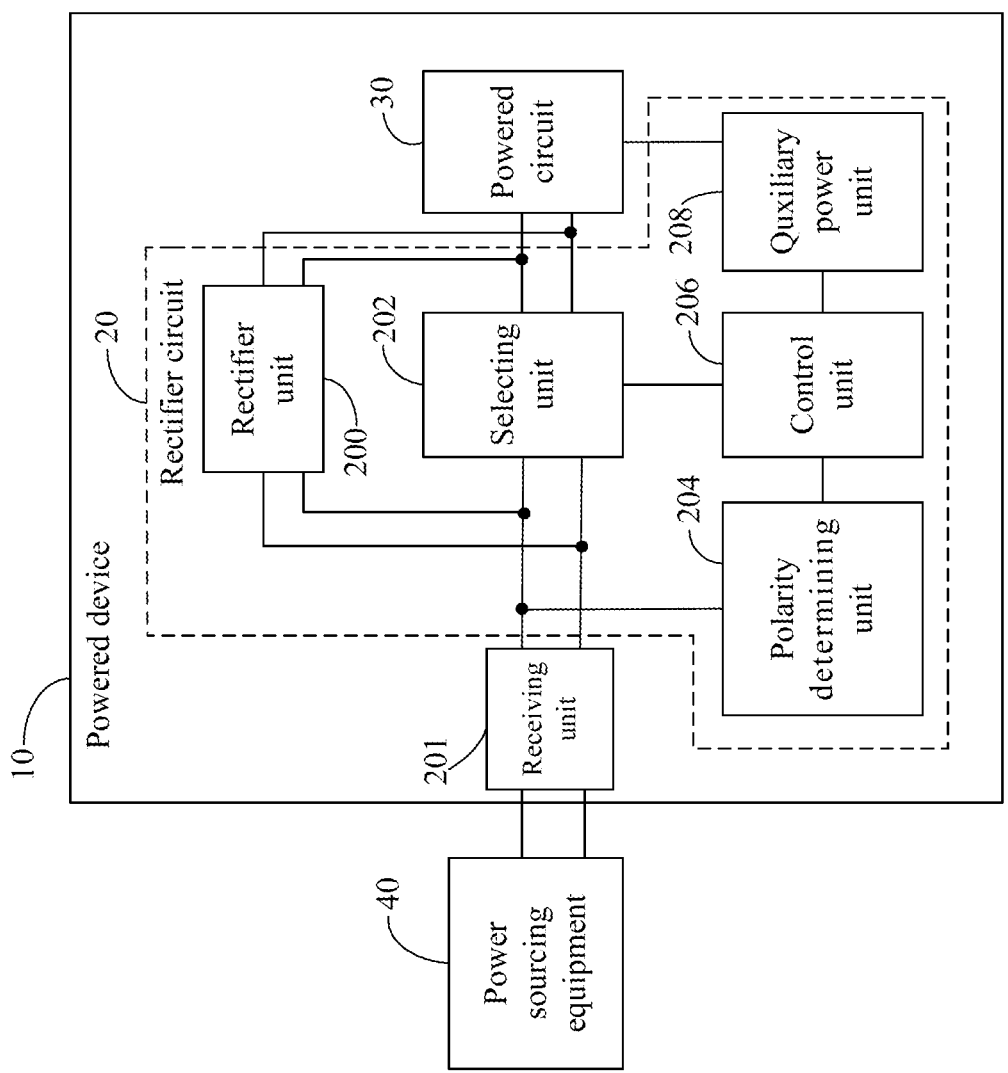
FIG. 1 is a function module diagram of one embodiment of a powered device.

FIG. 1 is a function module diagram of one embodiment of a powered device (PD) 10. In one embodiment, the PD 10 is applied in a power over Ethernet (POE). The POE comprises the PD 10 and a power source equipment (PSE) 40. The PSE 40 powers clients of the POE, and is a manager of the POE. The PD 10 is a loader powered by the PSE 40, and is a client of the POE, such as internet protocol (IP) phones, IP cameras, wireless access points, mobile phones, and laptops. After power supply conduction, different PDs have different resistance, and generate different characteristic impedances. The PSE 40 outputs power signal to the PD 10 through the Ethernet according to device type, connectivity, and power consumption level of information of the PD 10.

In one embodiment, the PSE 40 comprises a first output port and a second output port, the polarity of the first output port of the PSE 40 being opposite with the second output port. The PSE 40 detects a characteristic impedance of the PD 10, and outputs a power signal to the PD 10 according to the detected characteristic impedance of the PSE 40. The PSE 40 stores a corresponding relationship of the characteristic impedance and operating voltage. The PSE 40 selects the operating voltage to supply power for the PD 10 according to the characteristic impedance of the PD 10.

In one embodiment, in response to the PSE 40 being connected to the PD 10, the PSE 40 detects the characteristic impedance of the PD 10 to class the PD 10 and supply a corresponding operating voltage for the PD 10. In response to the PSE 40 being disconnected to the PD 10, the PSE 40 stops supplying power to the PD 10 immediately, and detects whether the PSE 40 is connected to the PD 10.

In one embodiment, the PD 10 comprises a powered circuit 30, a receiving unit 201, and a rectifier circuit 20. The receiving unit 201 comprises a first receiving port and a second receiving port. The first receiving port and the second receiving port of the receiving unit 201 are connected to the first output port and the second output port of the PSE 40 respectively, to receive the voltage signal output by the PSE 40. The powered circuit 30 comprises a positive input port, a negative input port, and an output port. The rectifier circuit 20 is connected between the receiving unit 201 and the powered circuit 30, to supply power for the powered circuit 30 according to the rectifier circuit 20 rectifying the voltage signal output by the PSE 40. In response to the rectifier circuit 20 having rectified the voltage signal output by the PSE 40, the positive input port of the powered circuit 30 is connected to a receiving port of the receiving unit 201 whose output voltage is positive, and the negative input port of the powered circuit 30 is connected to a receiving port of the receiving unit 201 whose output voltage is negative. The output port of the powered circuit 30 outputs an auxiliary power signal to the rectifier circuit 20.

In one embodiment, the rectifier circuit 20 comprises a rectifier unit 200, a selecting unit 202, a polarity determining unit 204, a control unit 206, and an auxiliary power unit 208.

The rectifier unit 200 comprises two output ports and two input ports, the input ports of the rectifier unit 200 are connected to the first receiving port and the second port of the receiving unit 201 respectively, the two output ports of the rectifier unit 200 are connected to the positive input port and the negative input port of the powered circuit 30 respectively. The rectifier unit 200 provides a current flow between the receiving unit 201 and the powered circuit 30, to confirm that fixed polarity of the voltage signal enters the positive input port and the negative input port of the powered circuit 30. In one embodiment, the rectifier unit 200 is a full bridge rectifier circuit constituted by four diodes.

The auxiliary power unit 208 is connected to the output port of the powered circuit 30, to receive the auxiliary power signal output by the powered circuit 30. The polarity of the auxiliary power signal is positive or negative, and the current of the auxiliary power signal is very small such that there is almost no power consumption in the auxiliary power unit 208.

The polarity determining unit 204 is connected to one of the first and second receiving ports of the receiving unit 201, and the polarity determining unit 204 detects the polarity of the voltage signal of the receiving port of the receiving unit 201 to generate a determining signal. In one embodiment, the polarity determining unit 204 is a comparator, and the determining signal is a high level signal or a low level signal. In response to the power signal of the receiving port which is connected to the polarity determining unit 204 of the receiving unit 201 being positive, the polarity determining unit 204 generates a high level signal. In response to the power signal of the receiving port which is connected to the polarity determining unit 204 of the receiving unit 201 being negative, the polarity determining unit 204 generates a low level signal.

The control unit 206 is connected to the auxiliary power unit 208 and the polarity determining unit 204. The control unit 206 outputs a control signal according to the determining signal generated by the polarity determining unit 204 and the polarity of the auxiliary power signal of the auxiliary power unit 208. For example, in response to the polarity of the auxiliary power signal of the auxiliary power unit 208 being positive and the determining signal being the high level signal, the control unit 206 outputs a control signal which turns on or turns off a switch.

The selecting unit 202 and the rectifier unit 200 are connected in parallel, and is connected to the control unit 206. The selecting unit 202 connects the positive input port of the powered circuit 30 to a receiving port of the receiving unit 201 whose output voltage is positive, and connects the negative input port of the powered circuit 30 to a receiving port of the receiving unit 201 whose output voltage is negative.

In one embodiment, in response to the PSE 40 outputting the power signal to the PD 10, the auxiliary power unit 208 receives the auxiliary power signal output by the powered circuit 30. The polarity determining unit 204 detects the polarity of the voltage signal of the PSE 40, and generates a determining signal. The control unit 206 outputs a control signal according to the determining signal generated by the polarity determining unit 204 and the polarity of the auxiliary power signal of the auxiliary power unit 208. The selecting unit 202 connects the positive input port of the powered circuit 30 to a receiving port of the receiving unit 201 whose output voltage is positive, and connects the negative input port of the powered circuit 30 to a receiving port of the receiving unit 201 whose output voltage is negative, to lower power of rectification. In the process of rectification, there is almost no current flowing into the powered circuit 30 through the rectifier unit 200, and all the current flows into the powered circuit 30 through the selecting unit 202 to reduce the loss in the process of the POE.

Figure 2:
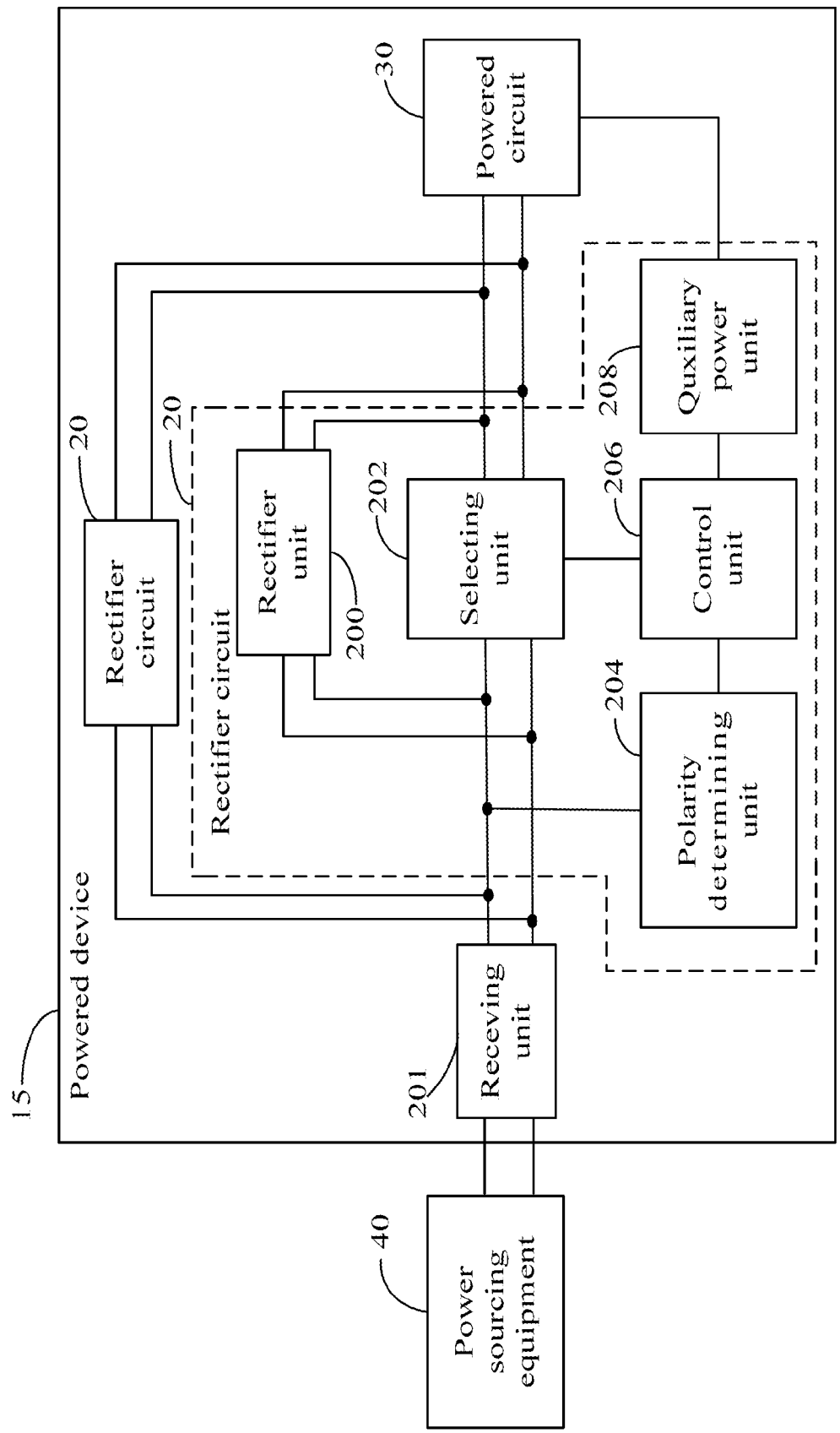
FIG. 2 is a function module diagram of another embodiment of a powered device.

FIG. 2 is a function module diagram of another embodiment of a PD 15. In this embodiment, the PD 15 comprises a plurality of rectifier circuits 20. In the illustrated embodiment, there are two rectifier circuits 20.

Figure 3:
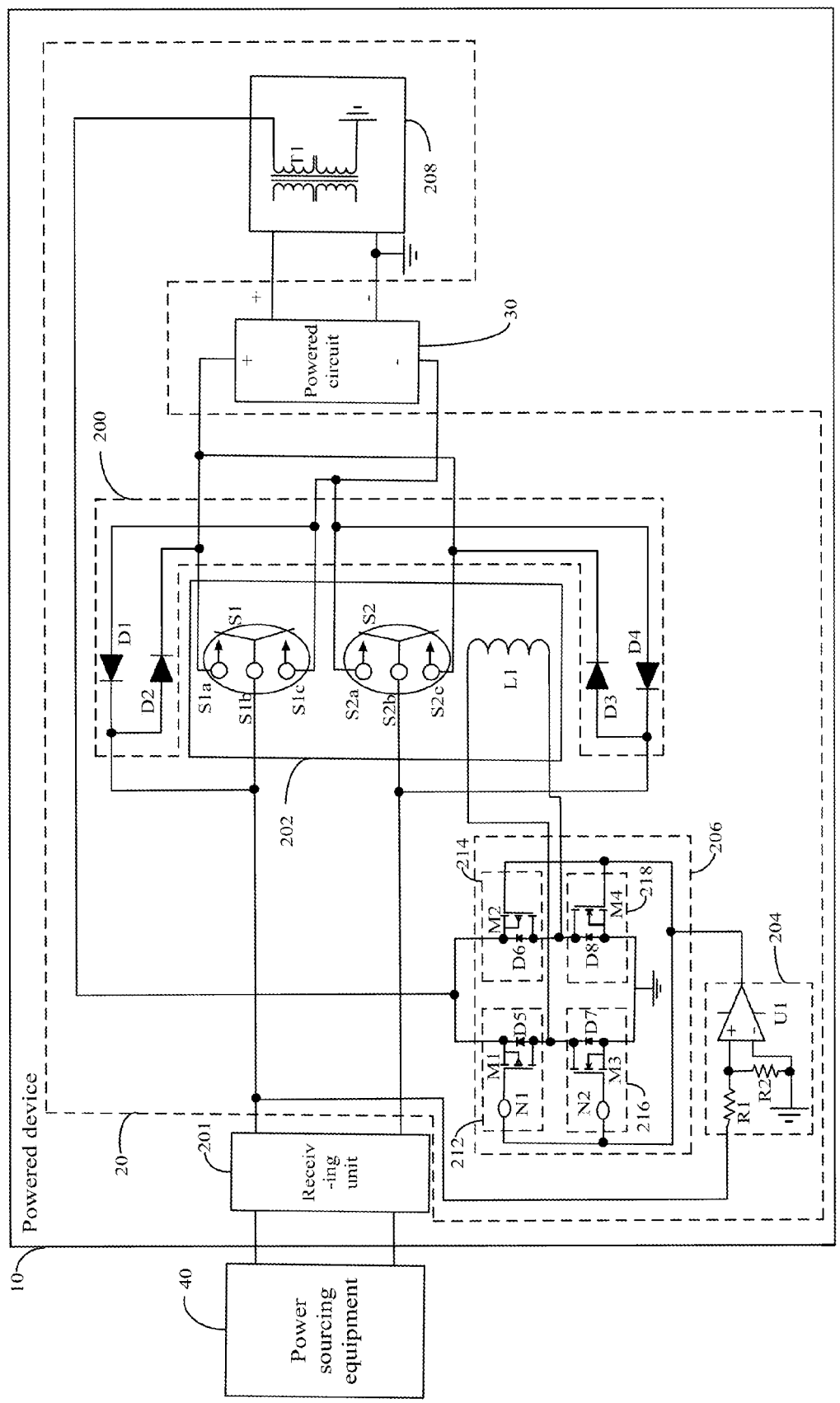
FIG. 3 is a circuit diagram of one embodiment of the powered device of FIG. 1.

FIG. 3 is a circuit diagram of one embodiment of the PD 10 of FIG. 1. In one embodiment, the PD 10 comprises a powered circuit 30, a receiving unit 201, and a rectifier circuit 20. The rectifier circuit 20 comprises a rectifier unit 200, a selecting unit 202, a polarity determining unit 204, a control unit 206, and an auxiliary power unit 208. The powered circuit 30 comprises a positive input port, a negative input port, a positive output port, and a negative output port. The receiving unit 201 comprises a first receiving port and a second receiving port. The first receiving port and the second receiving port of the receiving unit 201 are connected to the first output port and the second output port of the PSE 40 respectively, to receive the voltage signal output by the PSE 40.

In one embodiment, the rectifier unit 200 is a full bridge rectifier circuit comprising a first diode D1, a second diode D2, a third diode D3, and a fourth diode D4. A cathode of the first diode D1 and an anode of the second diode D2 are electronically connected to the first receiving port of the receiving unit 201, and an anode of the first diode D1 and an anode of the fourth diode D4 are electronically connected to the negative input port of the powered circuit 30. An anode of the third diode D3 and a cathode of the fourth diode D4 are electronically connected to the second receiving port of the receiving unit 201, and a cathode of the second diode D2 and a cathode of the third diode D3 are electronically connected to the positive input port of the powered circuit 30. In another embodiment, the rectifier unit 200 is a half bridge rectifier circuit.

The auxiliary power unit 208 comprises a direct current/direct current (DC/DC) converter comprising a positive input port, a negative input port, a positive output port, and a negative output port. The positive input port of the DC/DC converter is electronically connected to the positive output port of the powered circuit 30, the negative input port of the DC/DC converter and the positive output port of the powered circuit 30 are grounded, the negative output port of the DC/DC converter is grounded, and the positive output port of the DC/DC converter is electronically connected to the control unit 206 to output an auxiliary power signal into the control unit 206. In one embodiment, the polarity of the auxiliary power signal is positive or negative.

In one embodiment, the polarity determining unit 204 comprises a first resistor R1, a second resistor R2, and a comparator U1. One end of the first resistor R1 is electronically connected to the first receiving port of the receiving unit 201, the other end of the first resistor R1 is electronically connected to one end of the second resistor R2, and the other end of the second resistor R2 is grounded. The comparator U1 comprises a positive input port, a negative input port, and an output port. The positive input port of the comparator U1 is electronically connected to a node between the first resistor R1 and the second resistor R2, the negative input port of the comparator U1 is electronically connected to a node between the second resistor R2 and the ground, and the output port of the comparator U1 is electronically connected to the control unit 206. The comparator U1 compares the voltage of the first receiving port of the receiving unit 201 and ground, to output a high level signal or a low level signal to the control unit 206.

The control unit 206 comprises a first control circuit 212, a second control circuit 214, a third control circuit 216, and a fourth control circuit 218. The first control circuit 212 comprises a first metal-oxide semiconductor field effect transistor (MOSFET) M1, a first inverter N1, and a fifth diode D5. The first MOSFET M1 is p type MOSFET, the grid of the first MOSFET M1 is electronically connected to one end of the first inverter N1. The source of the first MOSFET M1 is electronically connected to the auxiliary power unit 208, that is, the source of the first MOSFET M1 is electronically connected to the positive output port of the DC/DC converter. The other end of the first inverter N1 is electronically connected to the output port of the polarity determining unit 204, that is, the first inverter N1 is electronically connected to the output port of the comparator U1. The fifth diode D5 is electronically connected between the source and the drain of the first MOSFET M1, the anode of the fifth diode D5 is electronically connected to the drain of the first MOSFET M1, and the cathode of the fifth diode D5 is electronically connected to the source of the first MOSFET M1.

The second control circuit 214 comprises a second MOSFET M2 and a sixth diode D6. The second MOSFET M2 is a p-type MOSFET, and the grid of the second MOSFET M2 is electronically connected to a node between the first inverter N1 and the polarity determining unit 204. The source of the second MOSFET M2 is electronically connected to a node between the first MOSFET M1 and the auxiliary power unit 208. The sixth diode D6 is electronically connected between the source and the drain of the second MOSFET M2, the anode of the sixth diode D6 is electronically connected to the drain of the second MOSFET M2, and the cathode of the sixth diode D6 is electronically connected to the source of the second MOSFET M2.

The third control circuit 216 comprises a third MOSFET M3, a second inverter N2, and a seventh diode D7. The third MOSFET M3 is an n-type MOSFET, and the grid of the third MOSFET M3 is electronically connected to one end of the second inverter N2. The source of the third MOSFET M3 is grounded, and the drain of the third MOSFET M3 is electronically connected to the drain of the first MOSFET M1. The other end of the second inverter N2 is electronically connected to a node between the first inverter N1 and the polarity determining unit 204, the seventh diode D7 is electronically connected between the source and the drain of the third MOSFET M3, the positive of the seventh diode D7 is electronically connected to the source of the third MOSFET M3, and the negative of the seventh diode D5 is electronically connected to the drain of the third MOSFET M3.

The fourth control circuit 218 comprises a fourth MOSFET M4 and an eighth diode D8. The fourth MOSFET M4 is an n-type MOSFET, and the grid of the fourth MOSFET M4 is electronically connected to a node between the first inverter N1 and the polarity determining unit 204. The source of the third MOSFET M3 is grounded, and the drain of the fourth MOSFET M4 is electronically connected to the drain of the second MOSFET M2. The eighth diode D8 is electronically connected between the source and the drain of the fourth MOSFET M4, the anode of the eighth diode D8 is electronically connected to the source of the fourth MOSFET M4, and the cathode of the eighth diode D8 is electronically connected to the drain of the fourth MOSFET M4.

In other embodiments, the MOSFET M1-M4 are transistors. In another embodiment, each of the MOSFET M1-M4 is an n-type MOSFET or a p-type MOSFET, to adjust the type of the MOSFET M1-M4 according to different conduction demand.

The selecting unit 202 comprises a first switch S1, a second switch S2, and a coil L1. The first switch S1 comprises a first end S1a, a second end S1b, and a third end S1c. The first end S1a and the third end S1c are fixed, and the second end S1b is removable. The second switch S2 comprises a fourth end S2a, a fifth end S2b, and a sixth end S2c. The fourth end S2a and the sixth end S2c are fixed, and the fifth end S2b is removable. In one embodiment, the second end S1b and the fifth end S2b are electronically connected to the first receiving port and the second receiving port of the receiving unit respectively. The first end S1a and the sixth end S2c are electronically connected to the positive input port of the powered circuit, and the third end S1c and the fourth end S2a are electronically connected to the negative input port of the powered circuit. The coil L1 comprises a first port and a second port, the first port of the coil L1 is electronically connected to a node between the drain of the first MOSFET M1 and the drain of the third MOSFET M3, and the second port of the coil L1 is electronically connected to a node between the drain of the second MOSFET M2 and the drain of the fourth MOSFET M4. In one embodiment, in response to the current of the auxiliary power signal flowing into the coil L1 from the first port and flowing out the coil L1 from the second port, and the current direction of the coil L1 is clockwise or counterclockwise The first switch S1 connects the second end S1b to the first end S1a or the third end S1c according to the current direction of the coil L1. In response to there being no current in the coil L1, the second end S1b is neither connected to the first end S1a nor connected to the third end S1c. The second switch S2 connects the fifth end S2b to the fourth end S2a or the sixth end S2c according to the current direction of the coil L1. In response to there being no current in the coil L1, the fifth end S2b is neither connected to the fourth end S2a nor connected to the sixth end S2c. For example, in response to the current direction of the coil L1 being clockwise, the second end S1b of the first switch S1 is electronically connected to the first end S1a, and the fifth end S2b of the second switch S2 is electronically connected to the fourth end S2a through a small current of the coil L1 to control the first switch S1 and the second switch S2, to connect the receiving unit 201 to the powered circuit 30 and lower power of rectification.

In one embodiment, in response to the PSE 40 being connected to the receiving unit 201 of the PD 10, the PSE 40 outputs a small current into the powered circuit 30 through the rectifier unit 200 constituted by the diodes D1-D4. The PSE 40 detects a characteristic impedance of the PD 10, and outputs a power signal to the PD 10 according to the detected characteristic impedance of the PSE 40. In response to the PSE 40 outputting the power signal to the PD 10, the DC/DC converter receives an auxiliary power signal output by the powered circuit 30, and outputs a small positive current. The comparator U1 compares the voltage of the first receiving port of the receiving unit 201 and ground to generate a determining signal, such as a high level signal. The channel between the source and the drain of the first MOSFET M1 of the first control circuit 212 can be conducted according to the high level signal generated by the comparator U1 and the small positive current output by the DC/DC converter, to make the small positive current flow into the coil L1 from the first port. The channel between the source and the drain of the fourth MOSFET M4 of the first control circuit 218 can be conducted according to the high level signal generated by the comparator U1 and the small positive current output by the DC/DC converter, to make the small positive current flow out the coil L1 from the second port to ground. Therefore, the current direction of the coil L1 is clockwise, the second end S1b of the first switch S1 is electronically connected to the first end S1a, and the fifth end S2b of the second switch S2 is electronically connected to the fourth end S2a to connect the receiving unit 201 to the powered circuit 30. The selecting unit 202 connects the positive input port of the powered circuit 30 to a receiving port of the receiving unit 201 whose output voltage is positive, and connects the negative input port of the powered circuit 30 to a receiving port of the receiving unit 201 whose output voltage is negative, to lower power of rectification. In the process of rectification, there is almost no current flowing into the powered circuit 30 through the rectifier unit 200, and most of the current flows into the powered circuit 30 through the selecting unit 202, to reduce the loss in the process of the POE.

The PD 10 can reduce the loss in the process of the POE. The POE comprises the PD 10 and the PSE 40. The rectifier unit 200 provides a current flow between the receiving unit 201 and the powered circuit 30. The auxiliary power unit 208 provides an auxiliary power signal. The polarity determining unit 204 detects the polarity of the voltage signal to generate a determining signal. The control unit 206 outputs a control signal according to the auxiliary power signal and the determining signal. The selecting unit 202 connects the positive input of the powered circuit 30 to a receiving end whose output voltage is positive according to the control signal, to lower power of rectification.

The foregoing disclosure of the various embodiments has been presented for purposes of illustration and description. It is not intended to be exhaustive or to limit the invention to the precise forms disclosed. Many variations and modifications of the embodiments described herein will be apparent to one of ordinary skill in the art in the light of the above disclosure. The scope of the invention is to be defined only by the claims appended hereto and their equivalents.

What is claimed is:

1. A powered device, electrically connected to a power sourcing equipment (PSE) comprising a first output port and a second output port having an polarity opposite to the first output port, the PSE outputting a voltage signal to the powered device, the powered device comprising:
   a powered circuit comprising a positive input port, a negative input port, and an output port;
   a receiving unit comprising a first receiving port and a second receiving port, the first receiving port and the second receiving port of the receiving unit being connected to the first output port and the second output port of the PSE respectively, to receive the voltage signal outputted by the PSE; and
   a rectifier circuit connected between the receiving unit and the powered circuit, to supply power for the powered circuit according to the rectifier circuit rectifying the voltage signal outputted by the PSE, the rectifier circuit comprising:
   a rectifier unit comprising two output ports and two input ports, the two input ports of the rectifier unit being connected to the first receiving port and the second port of the receiving unit respectively, the two output ports of the rectifier unit being connected to the positive input port and the negative input port of the powered circuit respectively, the rectifier unit providing a current flow between the receiving unit and the powered circuit;
   an auxiliary power unit connected to the output port of the powered circuit to receive an auxiliary power signal outputted by the powered circuit;
   a polarity determining unit connected to one of the first and second receiving ports of the receiving unit to detect the polarity of the voltage signal of the receiving port of the receiving unit and generate a determining signal;
   a control unit connected to the auxiliary power unit and the polarity determining unit respectively, to output a control signal according to the determining signal generated by the polarity determining unit and the polarity of the auxiliary power signal of the auxiliary power unit; and
   a selecting unit connected to the rectifier unit in parallel, and connected to the control unit, the selecting unit connecting the positive input port of the powered circuit to a receiving port of the receiving unit whose output voltage is positive, and connecting the negative input port of the powered circuit to a receiving port of the receiving unit whose output voltage is negative, according to the control signal.

2. The powered device of claim 1, wherein the rectifier unit comprises a first diode, a second diode, a third diode, and a fourth diode, a cathode of the first diode and an anode of the second diode are electronically connected to the first receiving port of the receiving unit, an anode of the first diode and an anode of the fourth diode are electronically connected to the negative input port of the powered circuit, an anode of the third diode and a cathode of the fourth diode are electronically connected to the second receiving port of the receiving unit, and a cathode of the second diode and a cathode of the third diode are electronically connected to the positive input port of the powered circuit.

3. The powered device of claim 1, wherein the control unit comprises a first control circuit, the first control circuit comprises a first metal-oxide semiconductor field effect transistor (MOSFET) and a first inverter, the grid of the first MOSFET is electronically connected to one end of the first inverter, the source of the first MOSFET is electronically connected to the auxiliary power unit, the other end of the first inverter is electronically connected to the output port of the polarity determining unit.

4. The powered device of claim 3, wherein the first control circuit further comprises a fifth diode electronically connected between the source and the drain of the first MOSFET, the anode of the fifth diode is electronically connected to the drain of the first MOSFET, and the cathode of the fifth diode is electronically connected to the source of the first MOSFET.

5. The powered device of claim 3, wherein the control unit further comprises a second control circuit, the second control circuit comprises a second MOSFET, the grid of the second MOSFET is electronically connected to a node between the first inverter and the polarity determining unit, and the source of the second MOSFET is electronically connected to a node between the first MOSFET and the auxiliary power unit.

6. The powered device of claim 5, wherein the second control circuit further comprises a sixth diode electronically connected between the source and the drain of the second MOSFET, the anode of the sixth diode is electronically connected to the drain of the second MOSFET, the cathode of the sixth diode is electronically connected to the source of the second MOSFET.

7. The powered device of claim 5, wherein the control unit further comprises a third control circuit, the third control circuit comprises a third MOSFET and a second inverter, the grid of the third MOSFET is electronically connected to one end of the second inverter, the source of the third MOSFET is grounded, the drain of the third MOSFET is electronically connected to the drain of the first MOSFET, and the other end of the second inverter is electronically connected to a node between the first inverter and the polarity determining unit.

8. The powered device of claim 7, wherein the third control circuit further comprises a seventh diode electronically connected between the source and the drain of the third MOSFET, the anode of the seventh diode is electronically connected to the source of the third MOSFET, and the cathode of the seventh diode is electronically connected to the drain of the third MOSFET.

9. The powered device of claim 7, wherein the control unit further comprises a fourth control circuit comprising a fourth MOSFET, the grid of the fourth MOSFET is electronically connected to a node between the first inverter and the polarity determining unit, the source of the third MOSFET is grounded, and the drain of the fourth MOSFET is electronically connected to the drain of the second MOSFET.

10. The powered device of claim 9, wherein the fourth control circuit further comprises an eighth diode electronically connected between the source and the drain of the fourth MOSFET, the anode of eighth diode is electronically connected to the source of the fourth MOSFET, and the cathode of eighth diode is electronically connected to the drain of the fourth MOSFET.

11. The powered device of claim 1, wherein the selecting unit comprises a first switch, a second switch, and a coil, the first switch comprises a first end, a second end and a third end, the second switch comprises a fourth end, a fifth end, and a sixth end, the second end and the fifth end are electronically connected to the first receiving port and the second receiving port of the receiving unit respectively, the first end and the sixth end are electronically connected to the positive input port of the powered circuit, the third end and the fourth end are electronically connected to the negative input port of the powered circuit, the coil comprises a first port and a second port, the first port and the second port of the coil are electronically connected to the control unit, and the coil confirms the current direction of the auxiliary power signal in the coil according to the control signal.

12. The powered device of claim 11, wherein the first end, the third end, the fourth end, and the sixth end are fixed, the second end and the fifth end are removable, the first switch connects the second end to the first end or the third end according to the current direction of the coil, and the second switch connects the fifth end to the fourth end or the sixth end according to the current direction of the coil.

13. The powered device of claim 12, wherein in response to the current direction of the coil being clockwise, the second end of the first switch is electronically connected to the first end, and the fifth end of the second switch is electronically connected to the fourth end to connect the receiving unit to the powered circuit.

14. The powered device of claim 1, wherein the polarity determining unit comprises a first resistor, a second resistor, and a comparator, one end of the first resistor is electronically connected to the first receiving port of the receiving unit, the other end of the first resistor is electronically connected to one end of the second resistor, the other end of the second resistor is grounded, the comparator comprises a positive input port, a negative input port, and an output port, the positive input port of the comparator is electronically connected to a node between the first resistor and the second resistor, the negative input port of the comparator is electronically connected to a node between the second resistor and the ground, the output port of the comparator is electronically connected to the control unit, and the comparator compares the voltage of the first receiving port of the receiving unit and ground to generate the determining signal to the control unit.

15. A powered device, electrically connected to a power sourcing equipment (PSE) comprising a first output port and a second output port having a polarity opposite to the first output port, the PSE outputting a voltage signal to the powered device, the powered device comprising:
  a powered circuit comprising a positive input port, a negative input port, and an output port;
  a receiving unit comprising a first receiving port and a second receiving port, wherein the first receiving port and the second receiving port of the receiving unit are connected to the first output port and the second output port of the PSE respectively, to receive the voltage signal outputted by the PSE; and
  a plurality of rectifier circuits connected between the receiving unit and the powered circuit to supply power for the powered circuit according to the rectifier circuits rectifying the voltage signal outputted by the PSE, each of the plurality of rectifier circuits comprising:
  a rectifier unit comprising two output ports and two input ports, the two input ports of the rectifier unit being connected to the first receiving port and the second port of the receiving unit respectively, the two output ports of the rectifier unit being connected to the positive input port and the negative input port of the powered circuit respectively, the rectifier unit providing a current flow between the receiving unit and the powered circuit;
  an auxiliary power unit connected to the output port of the powered circuit to receive an auxiliary power signal outputted by the powered circuit;
  a polarity determining unit connected to one of the first and second receiving ports of the receiving unit to detect the polarity of the voltage signal of the receiving port of the receiving unit and to generate a determining signal;
  a control unit connected to the auxiliary power unit and the polarity determining unit respectively, to output a control signal according to the determining signal generated by the polarity determining unit and the polarity of the auxiliary power signal of the auxiliary power unit; and
  a selecting unit connected to the rectifier unit in parallel, and connected to the control unit, the selecting unit connecting the positive input port of the powered circuit to a receiving port of the receiving unit whose output voltage is positive, and connecting the negative input port of the powered circuit to a receiving port of the receiving unit whose output voltage is negative, according to the control signal.

16. A rectifier circuit, electrically connected to a power sourcing equipment (PSE) comprising a first output port and a second output port having an polarity opposite to the first output port, to supply power for a powered circuit according to the rectifier circuit rectifying a voltage signal outputted by the PSE, the rectifier circuit comprising:
  a rectifier unit connected between the PSE and the powered circuit, that providing a current flow between the PSE and the powered circuit;
  an auxiliary power unit that receives an auxiliary power signal outputted by the powered circuit;
  a polarity determining unit connected to one of the first and the second output port of the PSE, to detect the polarity of the voltage signal of the output port of the PSE and to generate a determining signal;
  a control unit connected to the auxiliary power unit and the polarity determining unit respectively, to output a control signal according to the determining signal generated by the polarity determining unit and the polarity of the auxiliary power signal of the auxiliary power unit; and
  a selecting unit connected to the rectifier unit in parallel, and connected to the control unit, the selecting unit connecting a positive input port of the powered circuit to an output port of the PSE whose output voltage is positive, and connecting the negative input port of the powered circuit to an output port of the PSE whose output voltage is negative, according to the control signal.

17. The rectifier circuit of claim 16, wherein the selecting unit comprises a first switch, a second switch, and a coil, the first switch comprises a first end, a second end and a third end, the second switch comprises a fourth end, a fifth end, and a sixth end, the second end and the fifth end are electronically connected to the first receiving port and the second receiving port of the receiving unit respectively, the first end and the sixth end are electronically connected to the positive input port of the powered circuit, the third end and the fourth end are electronically connected to the negative input port of the powered circuit, the coil comprises a first port and a second port, the first port and the second port of the coil are electronically connected to the control unit, and the coil confirm the current direction of the auxiliary power signal in the coil according to the control signal.

18. The powered device of claim 17, wherein the first end, the third end, the fourth end, and the sixth end are fixed, the second end and the fifth end are removable, the first switch connects the second end to the first end or the third end according to the current direction of the coil, and the second switch connects the fifth end to the fourth end or the sixth end according to the current direction of the coil.

19. The powered device of claim 18, wherein in response to the current direction of the coil being clockwise, the second end of the first switch is electronically connected to the first end, and the fifth end of the second switch is electronically connected to the fourth end, to connect the receiving unit to the powered circuit.

20. The powered device of claim 16, wherein the polarity determining unit comprises a first resistor, a second resistor, and a comparator, one end of the first resistor is electronically connected to the first receiving port of the receiving unit, the other end of the first resistor is electronically connected to one end of the second resistor, the other end of the second resistor is grounded, the comparator comprises a positive input port, a negative input port, and a output port, the positive input port of the comparator is electronically connected to a node between the first resistor and the second resistor, the negative input port of the comparator is electronically connected to a node between the second resistor and the ground, the output port of the comparator is electronically connected to the control unit, and the comparator compares the voltage of the first receiving port of the receiving unit and ground to generate the determining signal to the control unit.

* * * * *